C. P. Benoit,
Piston-Rod Packing.
No 58,204.            Patented Sep. 25, 1866.

UNITED STATES PATENT OFFICE.

CHARLES P. BENOIT, OF DETROIT, MICHIGAN.

IMPROVEMENT IN PISTON-ROD PACKINGS.

Specification forming part of Letters Patent No. 58,204, dated September 25, 1866.

*To all whom it may concern:*

Be it known that I, CHARLES P. BENOIT, of Detroit, in the county of Wayne and State of Michigan, have invented a new and useful Improvement in Piston-Rod Packing; and I do hereby declare that the following is a full, clear, and exact description thereof, which will enable others skilled in the art to make and use the same, reference being had to the accompanying drawings, forming part of this specification, in which—

Figure 1:
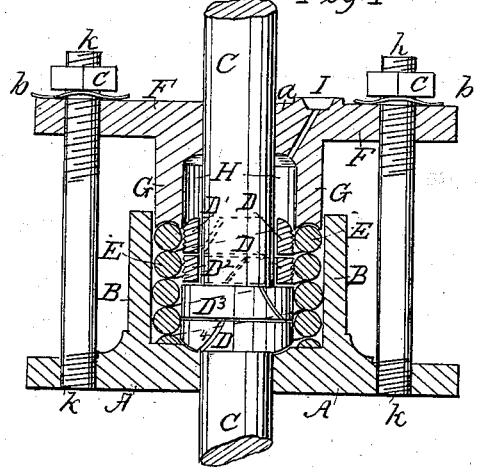
Figure 2:
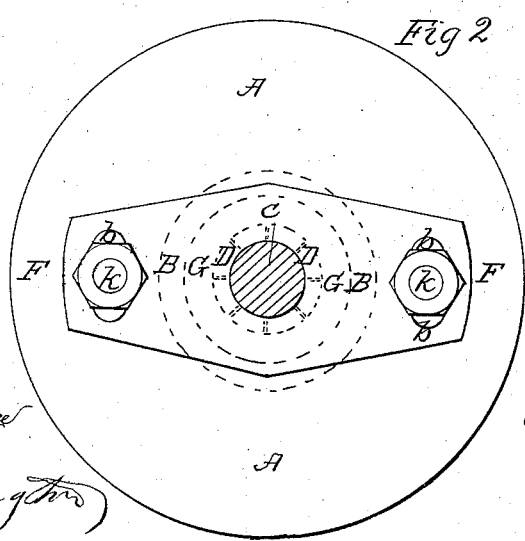

Figure 1 is a longitudinal section of a piston-rod packing. Fig. 2 is a plan of the same.

Similar letters of reference indicate like parts.

My invention relates to the packing of piston and valve rods, plungers, &c., and it consists of an arrangement of several novel devices which operate together effectively in preventing the escape of steam, water, or air, by keeping the packing next the rod smooth and in good order while in constant use for a long time, without the trouble and expense of the frequent renewal of the packing generally required. By my arrangement the packing-rings around the rod will always fit close and wear evenly as long as the brass or Babbitt metal lasts.

To enable others skilled in the art to make and use my invention, I will proceed to describe its construction and operation.

In Fig. 1, A represents the head or cover of a steam-chest, cylinder, or pump; B, the stuffing-box, attached around the piston-rod or plunger C; D D, packing-rings 1, 2, 3, and 4, next to the rod C; E, a coil of india-rubber or other suitable elastic packing between the rings D D and the shell of the stuffing-box B; F, cover of the stuffing-box, with projecting circular flange G, which fits inside of the shell of the box and incloses an annular space or lubricating-chamber, H, around the rod C, which is supplied with oil by the channel $a$ from the oil-cup I. K K are screw-bolts that secure the stuffing-box cover F to the cylinder-head A. Under the nuts $c\ c$ are strong elliptic springs $b\ b$, which regulate the pressure and guard against displacement of the nuts. The lower edge or lip of the flange G is cup-shaped or channeled, so as to fit snugly upon the top of the coil of elastic packing E, and press it evenly when screwed down.

The packing-rings D D are made in segments in the usual way, but instead of smooth exterior surfaces they have grooves or corrugated sides next to the coil of stuffing, which receive the impact of the yielding material when the coil is crowded down by the flange G, thus holding the packing-rings well in place and preventing their slipping when they wear away.

In the annular space H is stuffed raw cotton-wool, or cotton-wick, to retain the oil and keep the piston-rod well lubricated.

By the operation of the flange G, when screwed down by the nuts $c\ c$ on the screw-bolts K K, there is an equal pressure of the cup-shaped lip upon the top of the coil of elastic packing, C, constantly exerting a twofold force upon the rings D D, forward and sidewise, or inward against the piston-rod, and keeping the packing around the piston-rod perfectly steam, water, and air tight, with little trouble and cost, until the rings are quite worn out.

Having described my invention, and shown clearly the peculiar construction, arrangement, and operation of the several devices I employ, which in general are not entirely dissimilar from arrangements which others have invented, and are in use for the same purpose, but which, in details and special adaptations, differ essentially, and are very important in the practical results of their operation as regards economy and efficiency, I therefore desire to secure as my invention by Letters Patent, and claim as follows:

1. The corrugated or grooved packing-rings D D, in combination with the elastic coil of packing or stuffing E, the cup-lipped flange G, the annular space around the piston-rod C, or the lubricating-chamber H, with its connected oil-cup I, and the screw-bolts K K, with the springs $b\ b$ under the nuts $c\ c$, all constructed, arranged, and related to each other substantially in the manner and for the purposes herein described.

2. The lubricating-chamber H, combined with the piston-rod C, the flange G, and the packing-rings D D, substantially as and for the purposes herein described.

3. The cup-lipped flange G, combined with the elastic coil-packing E, and the corrugated rings D D, constructed and operated substantially as and for the purposes herein described.

CHARLES P. BENOIT.

Witnesses:
LEO DREISACHERN,
AUGUST F. DIEDERICH.